No. 738,769. PATENTED SEPT. 15, 1903.
W. BRYAN & W. A. PALFREYMAN.
TANK MOLD.
APPLICATION FILED MAY 29, 1903.
NO MODEL. 2 SHEETS—SHEET 1.

Witnesses
Jos. H. Blackwood
O. F. Randolph, Jr.

Inventors
William Bryan
Will A. Palfreyman
by D. A. Gourick
Attorney

No. 738,769. PATENTED SEPT. 15, 1903.
W. BRYAN & W. A. PALFREYMAN.
TANK MOLD.
APPLICATION FILED MAY 29, 1903.
NO MODEL. 2 SHEETS—SHEET 2.

No. 738,769.                                    Patented September 15, 1903.

UNITED STATES PATENT OFFICE.

WILLIAM BRYAN AND WILL. A. PALFREYMAN, OF ANGOLA, INDIANA.

TANK-MOLD.

SPECIFICATION forming part of Letters Patent No. 738,769, dated September 15, 1903.

Application filed May 29, 1903. Serial No. 159,319. (No model.)

*To all whom it may concern:*

Be it known that we, WILLIAM BRYAN and WILL. A. PALFREYMAN, citizens of the United States, and residents of Angola, in the county of Steuben and State of Indiana, have invented certain new and useful Improvements in Tank-Molds, of which the following is a specification.

Our invention relates to molds for making tanks of plastic material, and has for its objects to provide a mold that is adjustable as to shape and size of product that can be produced and that when not in use can be knocked down and stored in the smallest possible space.

The advantages of our invention will appear hereinafter and by reference to the accompanying drawings, in which—

Figure 1:
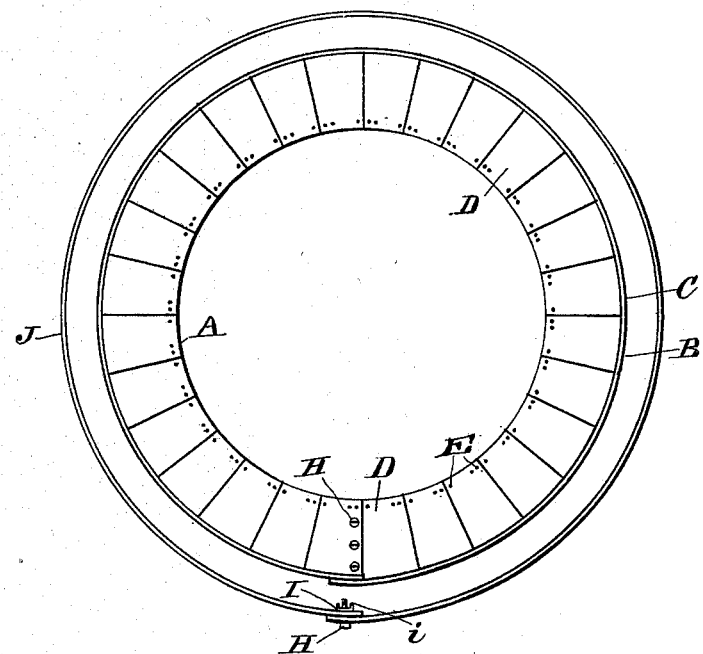
Figure 2:
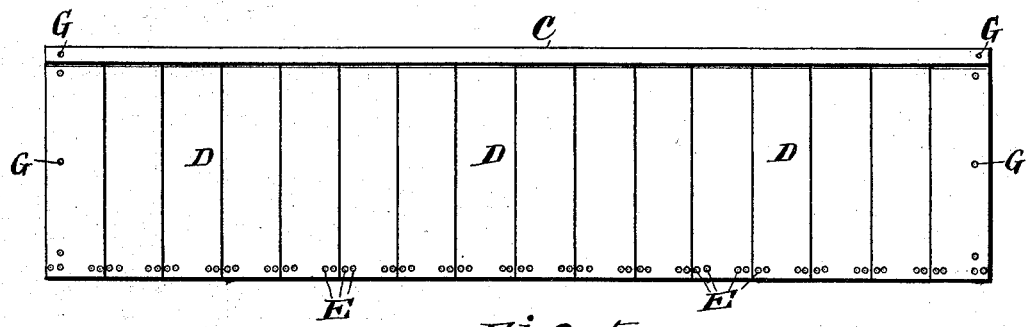
Figure 5:
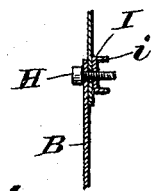
Figure 3:
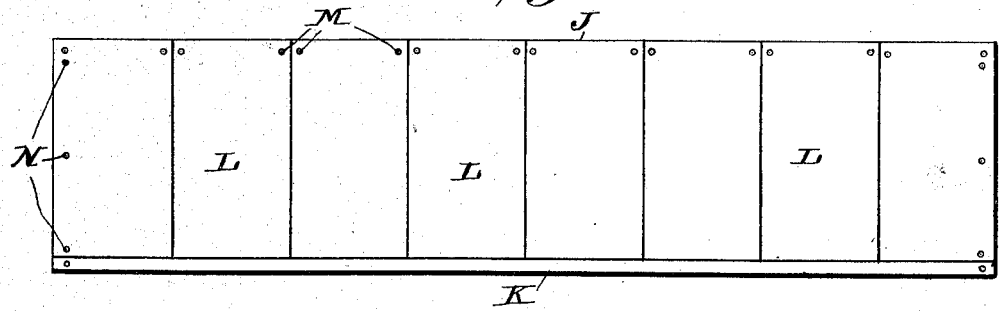
Figure 4:
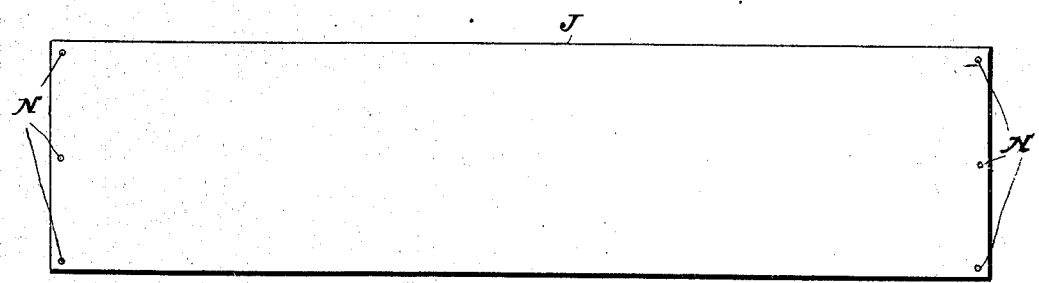
Figure 6:
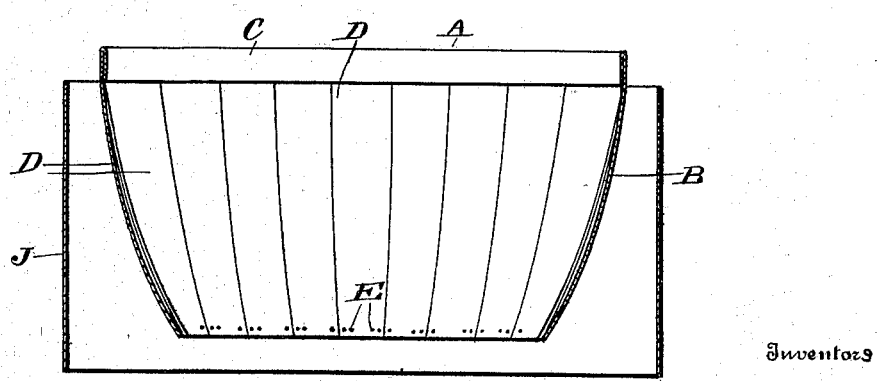

Figure 1 is a top plan view of a mold for forming a circular tank; Fig. 2, a detail view of one of the sections of the part for forming the inside of the tank; Fig. 3, a view of one of the sections for shaping the outside of the tank; Fig. 4, a view of a modification of the part shown in Fig. 3; Fig. 5, a detail view of the means for securing the sections together, and Fig. 6 a cross-section of Fig. 1.

Referring to the drawings, in which similar reference characters indicate corresponding parts throughout the several views, A represents the mold for forming the inside of the tank, which consists of one or more parts or sections B, made of sheet-steel preferably and having its top edge C continuous, while the lower part is slashed to form strips or slats D, that are capable of being bent to form the interior of the tank of the shape desired, E representing holes near the lower edges of said slats to receive rivets or pins to hold the slats in the position to give the interior of the tank the shape required. If but a small tank is to be molded, the top edge C of one section is bent to the desired shape and the two ends thereof secured through holes G in the end of edge C and the end slats D by means of screw-bolts H and nuts I, having lugs *i* thereon, that are embedded in the plastic material and prevent the nut turning when it is desired to unscrew the bolt to remove the mold after the tank is completed. The mold for the outer wall is also formed in sections J, preferably enough longer than sections B to allow for the thickness of the tank when completed, in Fig. 3 the section J being shown formed with a lower edge or band K and slats L with holes M at their upper edge to secure them together and holes N at the ends of the section for securing it together by means of bolts H and nuts I, as above described. In Fig. 4 is shown a section for forming the outer side of the tank that is continuous, this form being used when the outside of the tank is to be perpendicular.

If a larger tank than will be made by a single section is desired, two or more may be secured together in the same manner as the ends of a single section, as above described, and the ends of the combined sections secured together or lapped and secured through holes that may be drilled at any desired point intermediate of the ends of either or both sections.

In operating with our mold the outer mold is first placed in position and a mixture of plastic material—such as cement, sand, and water—is put in the inclosure and leveled to form the bottom of the tank. The inner part A is then placed in position inside of the outer mold an equal distance from it at all points or not, as desired, and the space between the inner and outer parts filled up with the plastic material. After the material has hardened the bolts H are removed and the sections of the inner and outer molds removed. After the nuts I have been picked out of the wall of the tank and the holes left thereby filled up with the cement the tank is completed and, when dried, ready for use.

It will be readily apparent that any shape of tank may be made by bending the inner and outer molds accordingly, also that a higher tank may be formed by raising the molds and extending the inner mold to conform to the shape of the first-formed part.

If it is desired to construct a hood over a portion or all of the tank, the inner mold may be reversed on top of the tank and then proceed as above described.

Having thus described our invention, what we claim is—

1. In a tank-mold, the inner part formed of sheet metal having its top edge continuous and its lower part consisting of a multiplicity of slats, substantially as shown and described.

2. In a tank-mold, the inner part formed of sheet metal having its top edge continuous and its lower part consisting of a multiplicity of slats each having a series of holes along its lower edge, substantially as shown and described.

3. In a tank-mold, the outer part formed of sheet metal having one edge a continuous band and the balance formed of a multiplicity of slats, substantially as shown and described.

4. In a tank-mold, the outer part formed of sheet metal having one edge a continuous band and the balance formed of a multiplicity of slats having series of holes near their free edge, substantially as shown and described.

5. In a tank-mold, the inner and outer parts formed of a series of sections, and bolts and nuts to secure said sections together, each of said nuts having outwardly-extending lugs, substantially as shown and described.

6. In a tank-mold, the inner and outer parts formed of a series of sections, the individual sections forming the outer part being longer than the sections forming the inner part, and bolts and nuts to secure said sections together, each of said nuts having outwardly-extending lugs, substantially as shown and described.

7. In a tank-mold, the inner and outer parts formed of a series of sections, each of said sections having a continuous band on one edge and the balance consisting of slats having a series of holes near their free edge, and means to secure the sections together, substantially as shown and described.

8. In a tank-mold, the inner and outer parts formed of a series of sections, each of said sections having a continuous band on one edge and the balance consisting of slats having a series of holes near their free edge, and bolts and nuts to secure said sections together, each of said nuts having outwardly-extending lugs, substantially as shown and described.

9. In a tank-mold, the inner and outer parts formed of a series of sections, the sections forming said parts having a continuous band on one edge and the remainder consisting of slats having a series of holes near their free edge, the sections forming the outer part being longer than the sections forming the inner part, and means to secure the sections together, substantially as shown and described.

10. In a tank-mold, the inner and outer parts formed of a series of sections, the sections forming said parts having a continuous band on one edge and the remainder consisting of slats having a series of holes near their free edge, the sections forming the outer part being longer than the sections forming the inner part, and bolts and nuts to secure said sections together, each of said nuts having outwardly-extending lugs, substantially as shown and described.

In testimony whereof we hereto affix our signatures in the presence of two witnesses.

WILLIAM BRYAN.
WILL. A. PALFREYMAN.

Witnesses:
ELLIS WOOD,
SAMUEL E. SHEFFER.